No. 724,931. PATENTED APR. 7, 1903.
A. W. PHILLIPS.
ANIMAL TRAP.
APPLICATION FILED NOV. 20, 1902.
NO MODEL.
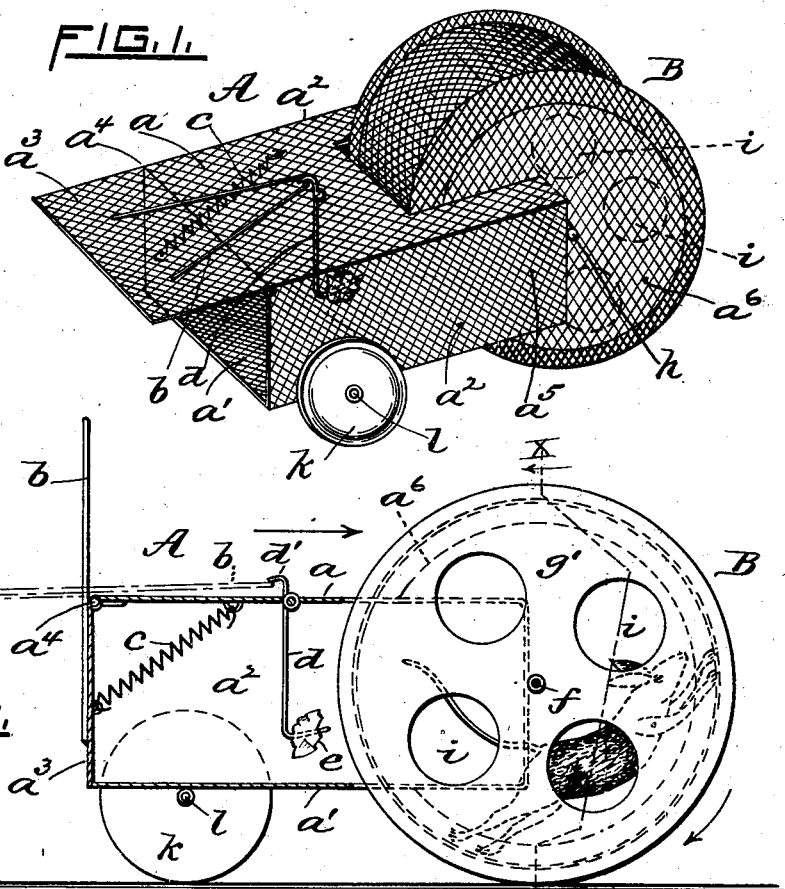
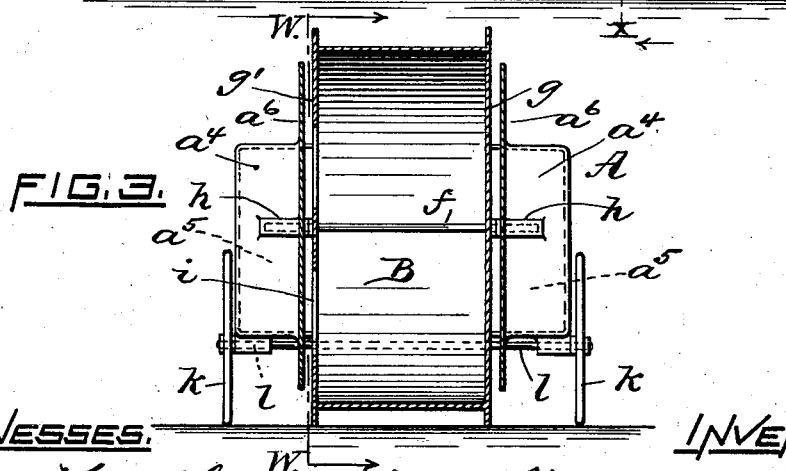
WITNESSES.
Elmer Walker
Wm. H. Peck
INVENTOR.
Allen W. Phillips.
by Charles T. Hannigan,
Attorney.

UNITED STATES PATENT OFFICE.

ALLEN W. PHILLIPS, OF PROVIDENCE, RHODE ISLAND, ASSIGNOR, BY DIRECT AND MESNE ASSIGNMENTS, TO THE ANIMAL AUTOMOBILE AND NOVELTY COMPANY, INCORPORATED, OF PROVIDENCE, RHODE ISLAND.

ANIMAL-TRAP.

SPECIFICATION forming part of Letters Patent No. 724,931, dated April 7, 1903.

Application filed November 20, 1902. Serial No. 132,172. (No model.)

*To all whom it may concern:*

Be it known that I, ALLEN W. PHILLIPS, a citizen of the United States, residing in the city and county of Providence and State of Rhode Island, have invented certain new and useful Improvements in Animal-Traps, of which the following is a specification.

This invention relates to an animal-trap mounted on wheels and one of which wheels forms a hollow casing that is provided with an opening in its side communicating with the cage of the trap; and the object of my invention is to provide means whereby the animal will move the trap upon the floor.

The invention consists in the novel construction and combination of parts, as hereinafter fully described and claimed.

In the accompanying drawings, Figure 1 represents a perspective view of my improved trap as set to catch the animal. Fig. 2 is a longitudinal sectional elevation view of the trap, taken in line W W of Fig. 3 and illustrating how the animal operates the movement of the trap; and Fig. 3 is a cross-sectional view of the trap, taken in line X X of Fig. 2.

Like letters of reference indicate like parts.

A designates the trap-cage, of a rectangular shape in cross-section and having top and bottom walls $a$ and $a'$ and two opposite side walls $a^2 a^2$, and these four walls terminate with an opening at each end of the cage. A door $a^3$ is hinged to the top wall at one end of the cage at a point $a^4$, and a bent wire $b$ has each of its ends soldered to the outer face of said door and projects vertically therewith.

$c$ is a coil-spring having its ends secured to the door $a^3$ and top wall $a$ of the cage.

$d$ is a trigger-rod pivoted to the top wall $a$ and arranged to receive the bait $e$ within the cage, and this rod has an outer bent portion $d'$ to engage upon the end of the wire or arm $b$ for the purpose of holding the door $a^3$ open when the trap is set to catch the animal in the manner as shown in Fig. 1.

B designates a hollow wheel or roller casing, and the width of this wheel is made somewhat narrower than the width of the cage A, which is divided to receive the said wheel at this end thereof and which wheel B is mounted and rotatable upon an axle $f$, whose ends project from the sides $g$ and $g'$ of said wheel and enter trunnions $h\ h$, secured to the opposite end walls $a^4 a^4$ of the cage A, as seen in Fig. 3. The side $g'$ of the wheel B is provided with one or more circular openings $i\ i$, which communicate with the inclosed end portions $a^5 a^5$ of the cage A, and each of said inclosed portions $a^5 a^5$ terminate inwardly with projecting circular flanges $a^6 a^6$, that are concentric to the axial center of the wheel B, and said flanges are in a plane close to the sides $g$ and $g'$ of the said wheel, and these flanges are arranged to cover the openings $i\ i$ in the same in the manner as shown in Fig. 3.

This animal-trap is provided with three wheels—the roller-casing B, as described, and two small wheels $k\ k$, mounted and rotatable upon the ends of an axle $l$, which is secured to the bottom of the cage.

When the trap is set, as illustrated in Fig. 1, the mouse or other small animal will eventually be attracted to the bait, and as soon as he pulls the same he detaches the trigger-rod $d$ from its connection with the wire or arm $b$ of the door $a^3$ and which is instantly closed by the spring $c$. After the animal has thus been caught alive within the cage in roaming about to find an exit he will enter the end inclosure $a^5$ of the cage, from whence he will pass through one of the openings $i$ and into the wheel-casing B, which as soon as the animal lands on its circular wall rotates, and thus causing the device to move upon the floor in the manner as illustrated in Fig. 2. To reduce the friction of the tread of the main wheel B in the movement of the trap, the sides $g$ and $g'$ project from its circular wall, as shown in Fig. 3.

In the construction of this device the cage A and wheel B are made entirely of wire-gauze or closely-perforated tin, not only to reduce the weight of the trap, but also to afford a clear view of the movements of the animal.

It will be readily understood from this description that the device may be shaped in the construction to represent a steam-roller, automobile, or other miniature vehicle.

This invention forms a very attractive device, is simple in its construction, and comparatively inexpensive to manufacture.

What I claim, and desire to secure by Letters Patent, is—

1. In an animal-trap, the combination of a cage provided with an opening at each end thereof, a trigger-rod pivotally mounted in said cage, a spring-controlled door hinged at one open end of said cage and arranged to be closed by the movement of said trigger, a wheel-casing pivotally mounted on said cage and provided with one or more openings in its side communicating with the interior at the opposite end of said cage, and means integral of the cage adapted to close over the openings in the said wheel-casing, substantially as shown and described.

2. In an animal-trap, the combination of a cage mounted on wheels, a bait-rod pivotally mounted in said cage, a door pivotally mounted on said cage and having an arm adapted to engage the end of said bait-rod, a pull-spring interposed between said door and said cage, an axle secured on said cage, two circular flanges integral with said cage and concentric to the center of said axle, an enlarged hollow flanged wheel pivotally mounted on said axle and interposed between the flanges of said cage, said hollow wheel provided with openings in its side and forming a passage from said hollow wheel to said cage, substantially as shown and described.

3. In an animal-trap, the combination of a cage mounted on wheels and one of which wheels is made hollow and provided with an opening in its side forming an exit between said cage and said hollow wheel, so arranged that when the animal enters the hollow wheel he causes the trap to move, substantially as set forth.

In testimony whereof I affix my signature in presence of two witnesses.

ALLEN W. PHILLIPS.

Witnesses:
  ELMER WALKER,
  WM. H. PECK.